United States Patent
Nolan (10) Patent No.: US 8,152,586 B2
(45) Date of Patent: Apr. 10, 2012

(54) SHATTERPROOF LIGHT TUBE HAVING AFTER-GLOW

(75) Inventor: Robert J. Nolan, Salisbury, NC (US)

(73) Assignee: Shat-R-Shield, Inc., Salisbury, NC (US)

( * ) Notice: Subject to any disclaimer, the term of this patent is extended or adjusted under 35 U.S.C. 154(b) by 236 days.

(21) Appl. No.: 12/228,232

(22) Filed: Aug. 11, 2008

(65) Prior Publication Data

US 2010/0033079 A1    Feb. 11, 2010

(51) Int. Cl.
*H01J 9/00*    (2006.01)

(52) U.S. Cl. .............. 445/58; 427/67; 313/512

(58) Field of Classification Search .............. 313/25, 313/634, 635; 445/25, 58; 427/67
See application file for complete search history.

(56) References Cited

U.S. PATENT DOCUMENTS

| | | | |
|---|---|---|---|
| 2,392,814 A | 1/1946 | Froelich | 252/301.4 |
| 2,436,182 A | 2/1948 | Schmidling | 252/301.3 |
| 2,706,691 A | 4/1955 | Schaefer | 117/33.5 |
| 3,213,341 A | 10/1965 | Scotti et al. | 317/258 |
| 3,294,699 A | 12/1966 | Lange | 252/301.4 |
| 3,377,494 A | 4/1968 | Repsher | 313/109 |
| 3,453,162 A | 7/1969 | Turner | 156/160 |
| 3,471,317 A | 10/1969 | Clock | 117/94 |
| 3,621,323 A | 11/1971 | Thomas et al. | 313/317 |
| 3,673,401 A | 6/1972 | Du Pont | 240/11.4 |
| 3,706,216 A | 12/1972 | Weingarten | 72/258 |
| 3,798,481 A | 3/1974 | Pollara | 313/110 |
| 3,902,946 A | 9/1975 | Audesse et al. | 156/198 |
| 3,932,048 A | 1/1976 | DuPont | 403/255 |
| 3,947,224 A | 3/1976 | Shaffer | 431/94 |
| 3,959,525 A | 5/1976 | Sentementes et al. | 427/185 |
| 4,048,537 A | 9/1977 | Blaisdell et al. | 313/489 |
| 4,061,461 A | 12/1977 | Hessenthaler | 425/462 |
| 4,065,589 A | 12/1977 | Lenard et al. | 428/35 |
| 4,198,199 A | 4/1980 | Dow et al. | 431/360 |
| 4,332,329 A | 6/1982 | Scriven et al. | 220/2.1 A |
| 4,499,850 A | 2/1985 | Nolan | 118/406 |
| 4,506,189 A | 3/1985 | Nolan et al. | 313/493 |
| 4,507,332 A | 3/1985 | Nolan et al. | 427/67 |
| 4,633,133 A | 12/1986 | Flaherty | 313/489 |
| 4,640,797 A | 2/1987 | Goguen | 252/301.36 |
| 4,804,886 A | 2/1989 | Nolan et al. | 313/489 |
| 4,898,702 A | 2/1990 | Elkins et al. | 264/145 |

(Continued)

FOREIGN PATENT DOCUMENTS

DE    195 30 769 A1    11/1996

(Continued)

OTHER PUBLICATIONS

International Search Report, Sep. 24, 2009 PCT/US09/04491.

*Primary Examiner* — Nimeshkumar Patel
*Assistant Examiner* — Mary Ellen Bowman
(74) *Attorney, Agent, or Firm* — K&L Gates LLP (57) ABSTRACT

A lamp or light tube that is both shatterproof and produces an after-glow effect. The light tube is comprised of a cylinder sealed by glass and metal end caps on each end of the glass-sealed cylinder, and electrical conducting pins extend from at least one of the metal end caps to connect the light tube to a power source. The glass-sealed cylinder is coated on its exterior with a shatterproof coating composition that emits an after-glow effect. The coating composition is comprised of a strontium aluminate after-glow phosphor, an ethylene acid copolymer resin, and an ultraviolet additive.

46 Claims, 2 Drawing Sheets

U.S. PATENT DOCUMENTS

| | | | |
|---|---|---|---|
| 5,034,650 A | 7/1991 | Nolan | 313/112 |
| 5,043,626 A | 8/1991 | Nolan | 313/489 |
| 5,124,618 A | 6/1992 | Ohtaka et al. | 313/489 |
| 5,132,045 A | 7/1992 | Osaka et al. | 252/301.36 |
| 5,173,637 A | 12/1992 | Sica | 313/489 |
| 5,324,885 A | 6/1994 | Koga et al. | 118/657 |
| 5,424,006 A | 6/1995 | Murayama et al. | 252/301.4 R |
| 5,514,298 A | 5/1996 | Terrell et al. | 252/301.4 H |
| 5,532,549 A | 7/1996 | Duzyk et al. | 313/489 |
| 5,536,998 A | 7/1996 | Sica | 313/489 |
| 5,607,621 A | 3/1997 | Ishihara et al. | 252/301.36 |
| 5,665,793 A | 9/1997 | Anders | 523/172 |
| 5,686,022 A | 11/1997 | Murayama et al. | 252/351.4 R |
| 5,698,301 A | 12/1997 | Yonetani | 428/213 |
| 5,770,111 A | 6/1998 | Moriyama et al. | 252/301.4 R |
| 5,945,462 A | 8/1999 | Salamon | 522/37 |
| 6,043,600 A | 3/2000 | Sica | 313/493 |
| 6,066,861 A | 5/2000 | Höhn et al. | 257/99 |
| 6,074,739 A | 6/2000 | Katagiri | 428/323 |
| 6,117,362 A | 9/2000 | Yen et al. | 252/301.4 R |
| 6,123,871 A | 9/2000 | Carroll | 252/301.36 |
| 6,246,167 B1 | 6/2001 | Sica | 313/493 |
| 6,359,381 B1 | 3/2002 | Okuno et al. | 313/485 |
| 6,375,864 B1 | 4/2002 | Phillips et al. | 252/301.33 |
| 6,452,325 B1 | 9/2002 | Dupont | 313/489 |
| 6,676,852 B2 | 1/2004 | Brown et al. | 252/301.36 |
| 6,692,659 B2 | 2/2004 | Brown et al. | 252/301.36 |
| 6,702,638 B2 | 3/2004 | Dupont | 445/58 |
| 6,818,153 B2 | 11/2004 | Burnell-Jones | 252/301.36 |
| 6,867,536 B2 | 3/2005 | Srivastava et al. | 313/487 |
| 6,917,154 B2 | 7/2005 | Bolta et al. | 313/487 |
| 6,932,920 B2 | 8/2005 | Toyoda et al. | 252/301.36 |
| 6,969,475 B2 | 11/2005 | Hyland, Jr. et al. | 252/301.4 R |
| 7,252,786 B2 | 8/2007 | Alfonso et al. | 252/301.36 |
| 7,303,697 B2 | 12/2007 | Isobe | 252/301.6 F |
| 7,572,479 B2 | 8/2009 | Nolan et al. | 427/67 |
| 2002/0187705 A1 | 12/2002 | Dupont et al. | 445/8 |
| 2003/0173540 A1 | 9/2003 | Mortz et al. | 252/301.36 |
| 2004/0012325 A1 | 1/2004 | Döll et al. | 313/486 |
| 2004/0043248 A1 | 3/2004 | Bharti | 428/690 |
| 2005/0242701 A1 | 11/2005 | Nomura et al. | 313/483 |
| 2006/0091360 A1 | 5/2006 | Hirayama et al. | 252/301.4 R |
| 2006/0158090 A1 | 7/2006 | Wang et al. | 313/485 |
| 2007/0096058 A1 | 5/2007 | Hirata et al. | 252/301.4 R |
| 2007/0166543 A1 | 7/2007 | Isobe et al. | 428/403 |
| 2007/0194280 A1 | 8/2007 | Saitoh et al. | 252/301.4 R |
| 2008/0012465 A1 | 1/2008 | Bolta | 313/486 |
| 2008/0018235 A1 | 1/2008 | Wang et al. | 313/503 |

FOREIGN PATENT DOCUMENTS

| | | |
|---|---|---|
| EP | 0 333 162 A2 | 3/1989 |
| EP | 1 715 022 A1 | 10/2006 |
| EP | 1 726 630 A1 | 11/2006 |
| GB | 0020882.7 | 8/2000 |
| GB | 0026549.6 | 10/2000 |
| WO | WO 02/16049 A1 | 2/2002 |
| WO | WO 2007/052092 A1 | 10/2007 | ise
SHATTERPROOF LIGHT TUBE HAVING AFTER-GLOW

FIELD OF THE INVENTION

The present invention relates to a shatterproof lamp or light tube having an after-glow effect and the method for the making thereof.

BACKGROUND OF THE INVENTION

A fluorescent lamp also referred to as a fluorescent light tube includes, among other things, and insofar as pertinent to the present invention, a generally cylindrically shaped glass envelope and end caps provided at either end of the glass envelope. Electrical connecting pins are provided on the end caps to connect the light tube to an electrical power source.

As is known to those skilled in the fluorescent light tube art, a light tube is subject to breakage if dropped or released from any appreciable height or if the light tube is struck by another object. Upon breakage, the glass envelope shatters into numerous glass shards, posing a threat of injury to bystanders or anyone attempting to handle the broken light tube. Thus, there has existed a need to apply a coating to fluorescent light tubes which upon the glass envelope being shattered will maintain the end caps in association with the light tube and contain the glass shards between the end caps. Providing a protective assembly or coating over the exterior of fluorescent light tubes for protecting the light tubes from impact and for retaining glass fragments and debris are known.

Furthermore, there is also a need in many situations to provide emergency lighting such as in an evacuation situation. In many emergency situations, there is a loss of electrical power and, thus, there is a need to still be able to see in an emergency or evacuation situation. Thus, it would be desirable to be able to see in such situations where there is either no light or low light. However, in many environments such as in a hospital, high rise building, hotel, or industrial settings, for example, there is a need to have both safety features, namely the protection from glass and the ability to see in no light or low light situations. To date, there has not been a lamp or light tube that has been able to achieve both such properties. Thus, the lamp or light tube of the present invention attempts to fill this need and improve upon existing lamps or light tubes that have one but not both features.

SUMMARY OF THE INVENTION

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

The present invention is directed to a lamp or light tube that is both shatterproof and produces an after-glow effect. The light tube is comprised of a cylinder sealed by glass and metal end caps on each end of the glass-sealed cylinder, and electrical conducting pins extend from at least one of the metal end caps to connect the light tube to a power source. The glass-sealed cylinder is coated on its exterior with a shatterproof coating composition that emits an after-glow effect. The coating composition is comprised of a strontium aluminate after-glow phosphor, an ethylene acid copolymer resin, and an ultraviolet additive.

In accordance with the present invention, the ethylene acid copolymer resin preferably comprises ethylene and methacrylic acid. In accordance with the present invention, the after-glow phosphor is strontium aluminate, preferably $SrAl_2O_4$:Eu,Dy.

The present invention is also directed to a method of making a lamp or light tube that is both shatterproof and emits an after-glow effect.

BRIEF DESCRIPTION OF THE DRAWINGS

The present invention will become more fully understood from the detailed description and the accompanying drawings, wherein.

DETAILED DESCRIPTION OF THE INVENTION

The following detailed description of the embodiment(s) is merely exemplary in nature and is in no way intended to limit the invention, its application, or uses.

The present invention relates to a light tube having properties of being both shatterproof and having an after-glow effect and to the method for the making thereof. In many instances, for both residential and commercial purposes, a light tube having such properties is desirable and an improvement over the state-of-the-art.

In accordance with the present invention, a polymeric translucent film or coating has been developed that, when energized by a light source, will charge it so that when the light source (such as sunlight or interior lighting) is removed, the coating provides an after-glow effect. It may require up to 1 hour to fully charge the film depending upon the power of the light source. Since response time is critical in an emergency situation, the after-glow allows the human eye to adjust quickly to the low light level and provides a tool for allowing a means of egress. It also serves as a shatterproof film if adhered to glass (windows, light fixtures, bulbs, covers, etc.)

The term "after-glow," as used herein, generally refers to the ability for a light tube to emit light for a period of time after a power source used to illuminate the light is disconnected or turned off.

A bulb or light tube suitable for being coated with the shatterproof after-glow composition for use in the present invention comprises, externally, a hollow glass cylinder sealed on each end by metal end caps with electrical conducting pins provided on the end caps. The metal end caps with pins act as both a connection to an electrical power supply for the light tube and also to maintain the structural integrity of the light tube. By the present invention, light tubes are fed through an extruder and coated with a molten thermo-plastic material. The thermoplastic material adheres to a portion of the end caps such that when cooled, the coating and end caps form a sealed sheath around the glass envelope. This adherence of the thermo-plastic material to the end caps, instead of to the glass envelope, ensures the containment of any glass shards within the sealed sheath if the light tube is broken.

The end caps include electrically conductive pins. These pins generally extend from the end caps in parallel alignment to the longitudinal axis of the glass envelope. The pins are inserted into a light receptacle and conduct electricity from the receptacle to the light tube as well as supporting the light tube within the light receptacle. Thus, the pins must remain free of coating material.

The shatterproof after-glow composition of the present invention comprises: a strontium aluminate after-glow phosphor, an ethylene acid copolymer resin, and an ultraviolet (UV) "package" that is comprised of an ethylene acid copolymer resin, a UV stabilizer, a UV absorber, an antioxidant, an emulsifier package, or a combination thereof.

The strontium aluminate after-glow phosphor is preferably of the formula $SrAl_2O_4$:Eu,Dy. Preferably, strontium aluminate after-glow phosphor emits a green light. However, this does not exclude that other forms of strontium aluminate after-glow phosphors are within the scope of the present invention and may emit other colors of light.

The strontium aluminate after-glow phosphor is preferably present in an amount greater than 15 weight percent of the shatterproof after-glow composition, more preferably greater than 20 weight percent of the shatterproof after-glow composition.

The ethylene acid copolymer resin is preferably present in an amount less than 82.5 weight percent of the shatterproof after-glow composition, more preferably less than 75 weight percent of the shatterproof after-glow composition.

The UV package is preferably present in an amount greater than zero weight percent to 3 weight percent of the shatterproof after-glow composition, more preferably greater than zero weight percent to 2.5 weight percent of the shatterproof after-glow composition.

The shatterproof after-glow coating composition of the present invention is surprisingly able to achieve its after-glow effect without the use of a fluorescent dye such as a daylight fluorescent dye.

In accordance with the present invention, glow pellets are prepared that comprise after-glow phosphor and ethylene acid copolymer resin. Preferably, the after-glow phosphor is blended in powder form with the ethylene acid copolymer resin. The ethylene acid copolymer which is preferably in pellet form is melted, and the after-glow phosphor powder is then blended with the molten resin at a weight ratio of about 75/25 (resin to after-glow phosphor) to create a concentrate. The concentrate is then cooled to a solid and cut back into extrudable glow pellets.

A suitable ethylene acid copolymer resin for use in the shatterproof after-glow composition of the present invention is a co-polymer of ethylene and methacrylic acid. The after-glow effect of an ethylene and methacrylic acid after-glow phosphor is a green yellow color. Ethylene acid copolymer resins suitable for use in the present invention include, but are not limited to, ethylene methacrylic acid copolymer (EMAA). A commercially available co-polymer of ethylene and methacrylic acid is NUCREL® ethylene acid copolymer resin from E.I. DuPont de Nemours and Company.

An example of a ultraviolet (UV) additive in the form of a UV package suitable for use in the present invention includes, but is not limited to, 92.95% ethylene acid copolymer resin, 3% TINUVIN® 327 from CIBA Specialty Chemicals Corporation (UV Absorber), 3% CYASORB® 3346 from Cytec Technology Corporation (UV Stabilizer), 0.30% CYANOX® from Cytec Technology Corporation (Antioxidant), and 0.75% Weston 619 of General Electric Specialty Chemicals Company (Emulsifier Package).

In accordance with the present invention, the glow pellets are blended with the UV package at a 97.5% to 2.5% ratio. The after-glow composition is then applied to a light tube such as by an extrusion process.

A suitable process for coating a bulb or light tube to make a shatterproof lamp in accordance with the present invention is described in co-pending, commonly assigned U.S. patent application Ser. No. 10/713,614, herein incorporated by reference. The process comprises coating the light tubes with molten polymeric material as the light tubes are fed, sequentially, through a cross head extruder. Prior to entering the cross head extruder, the end caps of the light tubes are heated. The pre-heating is performed to ensure that the coating adheres to the end caps and not to the glass cylinder so that, if broken, the end caps and the coating contain all of the glass shards. The light tubes are then conveyed, sequentially and in longitudinal alignment with one another, to the cross head extruder. A coating of molten polymeric material is extruded about each light tube. A vacuum is applied in the extruder to evacuate air from between each light tube and the coating to promote direct intimate contract of the coating with each light tube. Gaps are formed between each sequentially fed light tube and these gaps are also coated as the sequential light tubes are fed continuously through the extruder. The gaps are maintained at a length to prevent the coating from contacting the electrically conductive pins on the end caps of the light tubes such that the entirety of the end caps are uncovered. Upon exiting from the extruder, the chain of now coated light tubes and gaps are cooled to below the softening temperature of the thermoplastic material. After cooling, each light tube is separated from the chain of light tubes. This may be done in a variety of ways either by manual manipulation or by use of an automatic device. The separated light tubes are then conveyed to a finishing station where the end caps of the light tubes may be trimmed of excess coating, labeled, inspected and readied for packaging.

Figure 1:
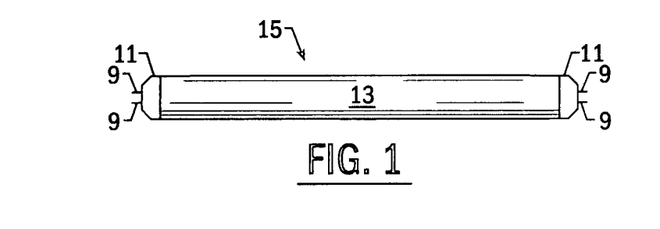
FIG. 1 is a plan view illustrating one design of a fluorescent light tube.

Referring to the figures, FIG. 1 illustrates an extrusion process in accordance with this method that is suitable for the purposes of this invention. As shown in FIG. 1, fluorescent light tubes 15 comprise a glass envelope 13 having end caps 11 attached to opposing ends of the glass envelope 13. Electrically conductive pins 9 extend from at least one end cap 11. It is desirable to coat the light tubes with an extruder in such a manner to ensure complete application of the coating material while eliminating the need to protect the pins during the coating process.

Figure 2:
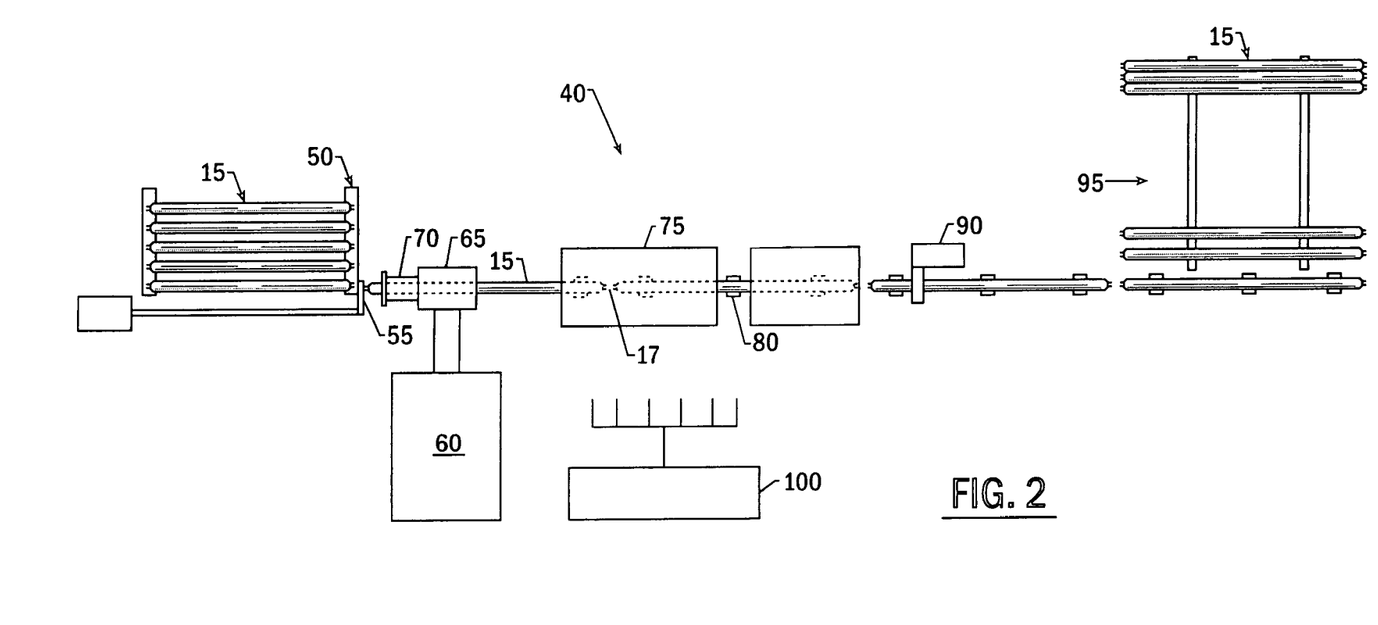
FIG. 2 is a schematic of a suitable apparatus and method for extrusion for use in the present invention.

Referring to FIG. 2, apparatus 40 for coating light tubes 15 according to the present invention comprises a heating table 50, a cross head extruder 65 with a vacuum assembly 70 attached thereto, and a control unit 100 connected therewith and controlling individual steps of the coating process. Preferably, the apparatus 40 also includes a cooling station 75, and a finishing station 95. An entrance conveyor system 55, disposed between the heating table 50 and the cross head extruder 65, impels the light tubes 15 sequentially, in longitudinal alignment with one another from the heating table 50 to the cross head extruder 65. An exit conveyor system 80, disposed between the cooling station 75 and the finishing station 95 further impels the light tubes 15 after the light tubes 15 have been coated and the coating has been cooled. An accelerating system 90 conveys the light tubes 15 to the finishing station 95. A passive conveying system maintains the light tubes 15 in proper alignment while traveling through the apparatus 40.

The heating table 50 comprises infra-red panels arranged to heat the end caps 11 of a plurality of light tubes 15. Infra-red panels are known by those of the coating art and are used extensively with fluidized bed type coatings. The infra-red panels are preferably controlled by the control unit 100.

Cross head extruders have been used for coating articles that do not have voids or gaps therein, such as wire and cable. A die within the cross head extruder 65 of the present invention conforms to the cross-section of the light tubes 15 and regulates the coating thickness. The cross head extruder 65 is connected to a vacuum hopper loader (not shown) through which is received the polymeric material, typically in pellet form. The thermo-plastic material is plastized in the extruder 60 and applied to the light tubes 15 via the cross head 65. The vacuum assembly 70 attached to the cross head extruder 65 applies a vacuum during extrusion, thus evacuating air from between each light tube 15 and the molten polymeric material, thus drawing the molten polymeric material into direct intimate contract with each light tube 15. The vacuum combines with the length of gap 17 between sequential light tubes 15 to prevent the molten polymeric material from contacting the pins 9 on the end caps 11 of the light tubes 15. The vacuum hopper, extruder 60, cross head 65 and vacuum assembly 70 are preferably controlled by the control unit 100.

Figure 3:
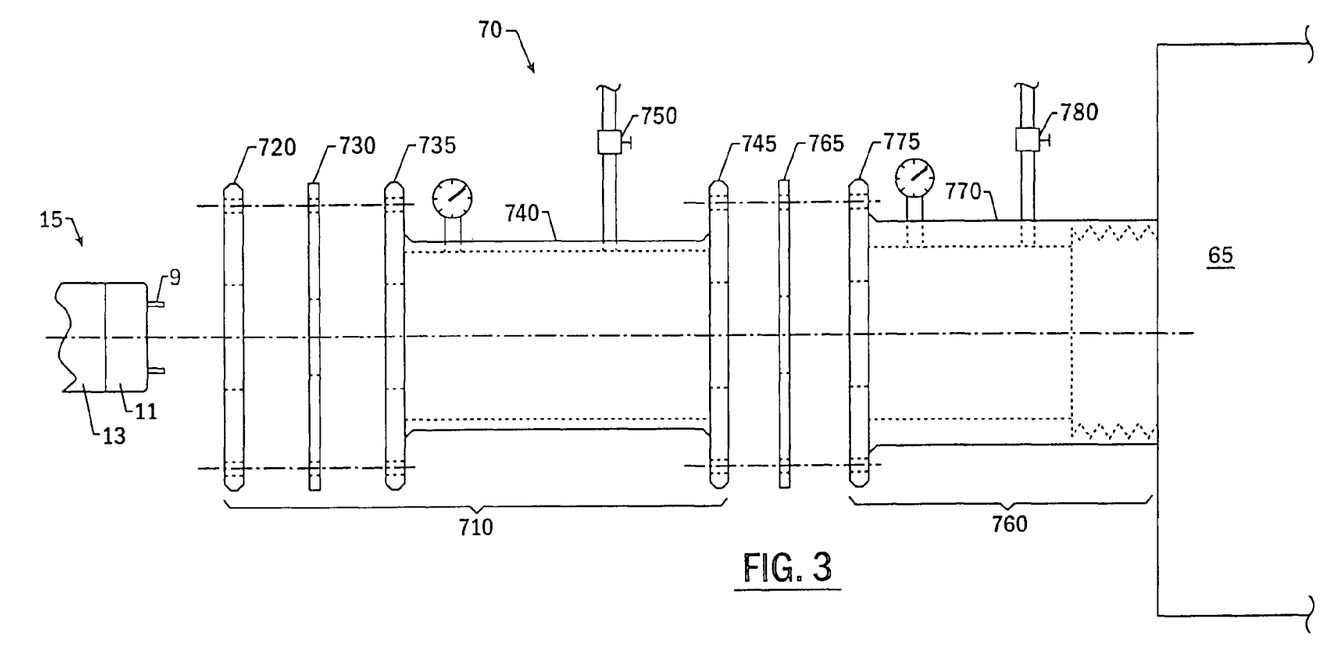
FIG. 3 is an expanded drawing of the vacuum assembly attached to the cross head extruder.

One embodiment of the vacuum assembly 70 is shown in greater detail in FIG. 3. The vacuum assembly 70 comprises a first vacuum array 710 connected with a second vacuum array 760, which is in direct communication with the cross head extruder 65. The first vacuum array 710 comprises an entrance seal plate 720 attached to an entrance of a vacuum chamber 740. A high temperature seal 730 disposed between the entrance seal plate 720 and the vacuum chamber 740 provides an air tight seal therebetween. A vacuum supply 750, preferably a vacuum pump (not shown) is attached to the vacuum chamber 740. An exit flange 745 of the vacuum chamber 740 of the first vacuum array 710 connects to an entrance flange 775 the second vacuum array 760. A high temperature seal 765 disposed between the exit flange 745 and the entrance flange 775 provides an air tight seal therebetween. The second vacuum array comprises the entrance flange 775 and a vacuum chamber 770 attached to a vacuum supply 780, preferably a vacuum pump (not shown). The vacuum chamber 770 of the second vacuum array 760 is attached to the cross head extruder 65 in a direct, fluid connection. A light tube 15 enters the vacuum assembly 70 through the entrance seal plate 720, travels trough the first vacuum array 710 and the second vacuum array 760, and enters the cross head extruder 65. The vacuum applied in the vacuum assembly 70 evacuates air around the light tube 15, promoting a direct and intimate contact between the light tube 15 and the polymeric material extruded about the light tube 15 within the cross heat 65.

The cooling station 75 cools the coating on the newly coated light tubes 15 and gaps 17 to below the softening temperature of the coating, thus permitting additional manipulation of the light tubes 15 in a timely fashion. The cooling of the coating also prevents the coating from turning opaque, which adversely impacts the brightness of the light tubes while in use. The cooling station 75 comprises a water bath, an air cooling system, or a combination thereof. Preferably, the cooling station 75 comprises a water bath capable of providing a constant supply of chilled water to cool the coating on the light tubes 15. The cooling station 75 may be controlled manually or, preferably, be controlled by the control unit 100.

The accelerating system 90 comprises a series of drive wheels operated independently of and at a greater travel rate than the entrance and exit conveying systems 55, 80. The accelerating system 90 provides a burst of speed to the separated light tubes 15, quickly impelling the light tubes 15 to the finishing station 95. The sudden increase in travel rate of the light tubes 15 also ensures that the separation of the light tubes 15 is complete. The accelerating system 90 is preferably controlled by the control unit 100.

The finishing station 95 comprises a labeling tool and a packaging station. The labeling tool places a label on the coating and is comprised, preferably of an ink jet type printing system. The labeling tool may be manually or automatically actuated. Preferably, the labeling tool is controlled by the control unit 100.

The entrance and exit conveyor systems 55, 80 comprise a series of indexed drive wheels controlled by the control unit 100. The indexing of the drive wheels is regulated by encoders and servos connected to each of the entrance and exit conveyor systems 55, 80. The entrance and exit conveyor systems 55, 80 are synchronized to ensure a consistent travel rate is maintained for the light tubes 15 undergoing the coating process.

The passive conveyor system (not shown) comprises a series of non-driven wheels spaced along the travel path of the light tubes 15 undergoing the coating process and is used to direct the light tubes 15 on the travel path.

The method of the present invention, utilizing the apparatus 40 discussed above begins by placing a plurality of light tubes 15 upon the heating table 50. The end caps 11 of each of the plurality of light tubes 15 are heated before the plurality of light tubes 15 engage the entrance conveyor system 55. The entrance conveyor system 55 impels the plurality of light tubes 15 sequentially and in longitudinal alignment with one another toward the cross head extruder 65. The sequential light tubes 15 are continuously fed to the cross head extruder 65 by the entrance conveyor system 55. Each light tube 15 is coated with the molten polymeric material while a vacuum is applied to evacuate air from between each light tube 15 and the coating to promote direct intimate contract of the coating with each light tube 15. The sequential feeding of light tubes 15 and the longitudinal alignment thereof creates gaps 17 between each of the light tubes 15. The gaps 17 are also coated as the sequential light tubes 15 are fed continuously through the cross head extruder 65, thus creating a chain of coated light tubes 15 connected by the coated gaps 17. Upon exiting the cross head extruder 65, the coated light tubes 15 and gaps 17 immediately enter the cooling station 75 wherein the light tubes 15 and gaps 17 are passed through a water bath of circulating chilled water, cooling the coating to below the softening temperature of the thermo-plastic material. The exit conveyor system 80 impels the chain of coated light tubes 15 and gaps 17. The accelerating system 90 speedily impels the individual coated light tubes 15 to the finishing station 95. At the finishing station 95, the individual coated light tubes 15 are trimmed of excess coating and labeled. The light tubes 15 may then be inspected and readied for packaging.

The coating applied to the light tubes 15 by the cross head extruder 65 is maintained within a desirable thickness range to ensure that the light tubes 15 are completely covered by a consistent thickness of polymeric material. The thickness may vary from about 10 mil to about 22 mil, preferably between about 14 mil and about 20 mil, and more preferably between about 16 mil and 18 mil.

The gaps 17 between the sequential light tubes 15 are maintained at a desired length to ensure that each light tube 15 is coated without interference from a preceding or succeeding light tube 15 and to prevent the coating from contacting the pins 9 of the end caps 11 of the light tube 15. The length of the gaps 17 may be regulated by adjusting the travel rate of the light tubes 15 undergoing the coating process. The gaps 17 have a length of between about 0.25 inch and 1.0 inch, preferably about 0.5 inch. The travel rate of the light tubes 15 is regulated by adjusting the speed of the series of indexed drive wheels of the entrance and exit conveyor systems 55, 80. The travel rate of the light tubes 15 is preferably between about 16 ft/min and 60 ft/min.

EXAMPLES

Example 1

Glow pellets were obtained. The glow pellets were comprised of 75 weight percent of NUCREL® ethylene acid copolymer resin and 25 weight percent of a $SrAl_2O_4$:Eu;Dy glow powder blend GCX117657 from RTP Company. The UV package was comprised of: 92.95% NUCREL® ethylene acid copolymer resin, 3% TINUVIN® 327 from CIBA Specialty Chemicals Corporation, 3% CYASORB® 3346 from Cytec Technology Corporation, 0.30% CYANOX® from Cytec Technology Corporation, and 0.75% Weston 619 of General Electric Specialty Chemicals Company.

In a run, the following components were combined using a Maguire WSB-140T Blender: Glow pellets at a setting of 999 and the UV Package at a setting of 2.5. The blender recognized the UV additive as a 2.5 weight % add and allowed for 25 grams of UV on a 1000 gram batch. The blender then dispensed as close to 975 grams as possible of the glow pellets. Once complete, the controller then calculated exactly 2.5 weight % of the dispensed weight of the glow pellets and made the appropriate UV addition. There was no NUCREL® ethylene acid copolymer resin added to the mixture other than what was already in the glow pellets. The glow pellets were pumped into extruder. At the extruder, the UV package and the glow pellets were mixed and extruded onto bulbs. The heat settings on the extruder were 400° F. for each of Zone #1, Zone #2, and Zone #3. The Die #1 and Die #2 temperature settings on the extruder were each 400° F. The end caps at each end of a bulb were preheated to 750° F. The bulbs coated were Sylvania Syl F32T8 850/XP/ECO (30 pieces). Both runs coated well. Separated good. Passed drop test. The drop test was performed from 14 feet; to pass, once dropped, the bulb must contain all the broken glass.

Example 2

Glow pellets were obtained. The pellets were comprised of 75 weight percent of NUCREL® ethylene acid copolymer resin and 25 weight percent of a $SrAl_2O_4$:Eu;Dy LUMENITE® glow powder blend from Luna Glow Pty Ltd.

The following components were combined in the following blender settings: glow pellets 99.9 and UV package 2.5. The UV package was same as in Example 1. In a run, the following components were combined using a Maguire WSB-140T Blender: glow pellets at a setting of 999 and the UV Package at a setting of 2.5. The blender recognized the UV additive as a 2.5 weight % add and allowed for 25 grams of UV on a 1000 gram batch. The blender then dispensed as close to 975 grams as possible of the glow pellets. Once complete, the controller then calculated exactly 2.5 weight % of the dispensed weight of the glow pellets and made the appropriate UV addition. There was no NUCREL® ethylene acid copolymer resin added to the mixture other than what was already in the glow pellets. The glow pellets were pumped into extruder. At the extruder, the UV package and glow pellets were mixed and extruded onto bulbs. The heat settings on the extruder were 400° F. for each of Zone #1, Zone #2, and Zone #3. The Die #1 and Die #2 temperature settings on the extruder were each 400° F. The screw speed was 60 rpm.

The end caps at each end of a bulb were preheated at one end to 750° F. and the other end to 770° F. The bulbs used were Sylvania Syl F3T8 850/XP/ECO (30 pieces). The bulbs coated well. Pulled good. Passed drop test.

Example 3

Glow pellets were obtained. The pellets were comprised of 75 weight percent of NUCREL® ethylene acid copolymer resin and 25 weight percent of a $SrAl_2O_4$:Eu;Dy glow powder blend GCX117657 obtained from RTP Company. On a sample run, the following components were combined in the following blender settings: UV package 2.5 and glow pellets 99.9. UV package was same as in Example 1. Glow pellets were pumped into extruder. At the extruder, the UV package and glow pellets were mixed and extruded onto bulbs. The bulbs used were Sylvania F32T8 850/XP/ECO (100 pieces). Ran good. Pulled great. Passed drop test. Easy to strip. Installed bulbs for burn test. Passed burn test. The burn test was conducted by lighting the bulb in a fixture to determine if it lights and how coating performed while lit and how coating performed when power source turned off to see how bulb glowed. A determination of passed or failed was determined by visual inspection.

Example 4

Glow pellets were obtained. The glow pellets were comprised of 75 weight percent of NUCREL® ethylene acid copolymer resin and 25 weight percent of a $SrAl_2O_4$:Eu;Dy LUMENITE® glow powder blend from Luna Glow Pty Ltd.

The following components were combined in the following blender settings: UV package 2.5 and glow pellets 99.9. UV package was same as in Example 1.

The glow pellets were pumped into extruder. At the extruder, the UV package and glow pellets were mixed and extruded onto bulbs. The heat settings on the extruder were 400° F. for each of Zone #1, Zone #2, and Zone #3. The Die #1 and Die #2 temperature settings on the extruder were each 400° F. The screw speed was 60 rpm.

The end caps at each end of a bulb were preheated at one end to 750° F. and the other end to 770° F. The bulbs used were Phillips PF32T8TL730 Alto (50 pieces), PF32T8TL741/Plus/Alto (50 pieces), and PF32T8TL850/Alto (50 pieces).

Two coating thicknesses were tested. The bulbs were coated thin at 17 mils. The bulbs were also coated thick at 30 mils. The bulbs did not separate cleanly on ends but passed drop test. Test results still considered favorable because failure for ends to separate cleanly was a water quenching issue at the crosshead die and not related to the extruded polymer.

COMPARATIVE EXAMPLES

Experiments were conducted that demonstrated that not all types of polymers and not all compositions were suitable for use in achieving the shatterproof after-glow lamp of the present invention.

Comparative Example 1

Polymer material used for testing was EASTAR® EN001 copolyester from Eastman Chemical. Received and uncrated drier, assembled, wired and ran water line to drier. Dried 300 lbs of polymer material overnight for test. Material was milky at start. As went up on temperature on the extruder, material got clearer. Had to max out all temperatures on the extruder. Coated Phillips PF32T8TL850/Plus Alto bulbs. Polymer material did not extrude well. Clogged up screen. After test had to remove crosshead, clean diffuser and replace screen, reinstall crosshead. Coated bulbs failed drop test because material too rigid.

Comparative Example 2

Pellets were obtained for extrusion that comprised 75 weight % of polypropylene and 25 weight % of a $SrAl_2O_4$: Eu;Dy LUMENITE® glow phosphor blend from Luna Glow Pty Ltd. The pellets were added to the extruder and extruded onto bulbs. The bulbs used were Phillips PF32T8TL730Alto (1 piece), PF32T8TL741/Plus/Alto (1 piece), PF32T8TL850/Alto (1 piece). The extrusion did not work. The plastic would not stick to glass or end caps of the bulbs. Tried to run three times. Same result each time. Different heat ranges on the extruder were attempted but still did not work.

Comparative Example 3

Polypropylene pellets (extrusion grade) were obtained from Plascoat Systems Ltd. as 1Y1400 Extrusion Grade Granules.

The pellets were added to the extruder and extruded onto light bulbs. The bulbs used were Sylvania Syl F32T8 850/XP/ECO (60 pieces) and Phillips PF48T8/HO/TL835 Alto (24 pieces). The heat settings on the extruder were 450° F. for each of Zone #1, Zone #2, and Zone #3. The Die #1 and Die #2 temperature settings on the extruder were each 450° F. The screw speed was 58 rpm. The end caps at each end of a bulb were preheated at one end to 790° F. and the other end to 800° F.

There were two drop test failures due to material splitting. It did not separate cleanly on ends. There was a tendency to pull on the end caps. Installed two of the bulbs for a burn test. The bulbs did not pass the burn test.

Comparative Example 4

High Density Polyethylene (HDPE) was tested with no glow phosphor or glow pellets. The HDPE was obtained from Huntsman as High Density Polyethylene H2103.

On a first sample run, the following components were combined in the following blender settings: UV package 2.5 and HDPE pellets 97.5. The UV package was comprised of: 92.95% NUCREL® ethylene acid copolymer resin, 3% TINUVIN® 327 from CIBA Specialty Chemicals Corporation, 3% CYASORB® 3346 from Cytec Technology Corporation, 0.30% CYANOX® from Cytec Technology Corporation, and 0.75% Weston 619 of General Electric Specialty Chemicals Company.

In a run, the following components were combined using a Maguire WSB-140T Blender: Glow pellets at a setting of 999 and the UV Package at a setting of 2.5. The blender recognized the UV additive package as a 2.5 weight % add and allowed for 25 grams of UV on a 1000 gram batch. The blender then dispensed as close to 975 grams as possible of the glow pellets. Once complete, the controller then calculated exactly 2.5 weight % of the dispensed weight of the glow pellets and made the appropriate UV addition. At the extruder, the UV package and HDPE pellets were mixed and extruded onto bulbs. The bulbs were Shat-R-Shield F96T12 CW/HO (15 pieces) and Phillips F96T12 CW/VHO (15 pieces). The plastic had white appearance. The ends did not separate cleanly. The bulbs did not pass drop test.

Comparative Example 5

High Density Polyethylene (HDPE) was tested with no glow phosphor or glow pellets. The HDPE was obtained from PolyOne as High Density Polyethylene H2103.

On a second sample run, the following components were combined in the following blender settings: NUCREL® ethylene acid copolymer resin 50, UV package 2.5, and HDPE 50. UV package was same as in Comparative Example 4. In a run, the following components were combined using a Maguire WSB-140T Blender: NUCREL® ethylene acid copolymer resin at a setting of 50, the UV Package at a setting of 2.5, and the HDPE at a setting of 50. The blender recognized the UV additive package as a 2.5 weight % add and allowed for 25 grams of UV on a 1000 gram batch and the HDPE as a 50 weight % addition and allowed for 500 grams on a 1000 gram batch. The blender then dispensed as close to 475 grams as possible of the NUCREL® ethylene acid copolymer resin pellets. Once complete, the controller then calculated exactly 2.5 weight % of the dispensed weight of the NUCREL® ethylene acid copolymer resin and made the HDPE addition. At the extruder, the NUCREL® ethylene acid copolymer resin, UV package, and HDPE were mixed and extruded onto bulbs. The bulbs used were Shat-R-Shield F96T12 CW/HO (15 pieces) and Phillips F96T12 CW/VHO (15 pieces). The plastic had white appearance. Ends separated a little cleaner than with the first sample run of Comparative Example 4. Did not pass drop test.

Comparative Example 6

High Density Polyethylene (HDPE) was tested with no glow phosphor or glow pellets. The HDPE was obtained from PolyOne as High Density Polyethylene H2103.

On a sample run, the following components were combined in the following blender settings: NUCREL® ethylene acid copolymer resin 25, UV package 2.5, and HDPE 75. UV package was same as in Comparative Example 4.

In a run, the following components were combined using a Maguire WSB-140T Blender: NUCREL® ethylene acid copolymer resin at a setting of 25, the UV Package at a setting of 2.5, and the HDPE at a setting of 75. The blender recognized the UV additive package as a 2.5 weight % add and allowed for 25 grams of UV package on a 1000 gram batch and the HDPE as a 75 weight % addition and allowed for 750 grams on a 1000 gram batch. The blender then dispensed as close to 225 grams as possible of the NUCREL® ethylene acid copolymer resin pellets. Once complete, the controller then calculated exactly 2.5 weight % of the dispensed weight of the NUCREL® ethylene acid copolymer resin and made the HDPE addition. At the extruder, the NUCREL® ethylene acid copolymer resin, UV package, and HDPE were mixed and extruded onto bulbs. The bulbs used were Shat-R-Shield F96T12 CW/HO (15 pieces). First drop test passed. Second drop test failed. Extruded thin at 12 mils. Thickness was measured by stripping approximately 8 to 10 inches from the end of a bulb then using a micrometer to verify actual mil thickness.

On a next sample run, the following components were combined in the following: NUCREL® ethylene acid copolymer resin 50, UV package 2.5, and HDPE 50. UV package same as above run. At the extruder, the NUCREL®, UV package, and HDPE were mixed and extruded onto bulbs. The bulbs used were Shat-R-Shield F96T12 CW/HO (15 pieces). The bulbs did not pass drop test.

On another sample run, the following components were combined in the following blender settings: NUCREL® ethylene acid copolymer resin 25, UV package 2.5, and HDPE 75. In a run, the following components were combined using a Maguire WSB-140T Blender: NUCREL® ethylene acid copolymer resin at a setting of 25, the UV Package at a setting of 2.5, and the HDPE at a setting of 75. The blender recognized the UV additive package as a 2.5 weight % add and allowed for 25 grams of UV on a 1000 gram batch and the HDPE as a 75 weight % addition and allowed for 750 grams on a 1000 gram batch. The blender then dispensed as close to 225 grams as possible of the NUCREL® ethylene acid copolymer resin pellets. Once complete, the controller then calculated exactly 2.5 weight % of the dispensed weight of the NUCREL® ethylene acid copolymer resin and made the appropriate UV addition and 50 weight % of the dispensed weight of the NUCREL and made the HDPE addition. At the extruder, the NUCREL®, UV, and HDPE were mixed and extruded onto bulbs. The bulbs used were Shat-R-Shield F96T12 CW/HO (15 pieces). The bulbs were installed and subjected to burn test. Bulbs failed testing due to polymer degradation at cathode end of fluorescent lamp.

Comparative Example 7

High Density Polyethylene (HDPE) was tested with no glow phosphor or glow pellets. The HDPE was obtained from PolyOne as High Density Polyethylene H2103.

On a first sample run, the following components were combined in the following blender settings: UV package 2.5 and HDPE 100. UV package same as Comparative Example 4.

In a run, the following components were combined using a Maguire WSB-140T Blender: HDPE at a setting of 100 and the UV Package at a setting of 25. The blender recognized the UV additive package as a 2.5 weight % add and allowed for 25 grams of UV package on a 1000 gram batch. The blender dispensed as close to 975 grams as possible of HDPE. Once complete, the controller then calculated exactly 2.5 weight % of the dispensed weight of HDPE and made the appropriate UV package addition. At the extruder, the UV package and HDPE were mixed and extruded onto bulbs. The bulbs used were Shat-R-Shield F96T12 CW/HO (20 pieces). Failed drop test because too brittle.

On a second sample run, the following components were combined in the following blender settings: UV package 2.5, NUCREL® ethylene acid copolymer resin 10, and HDPE 90. UV package same as above run. At the extruder, the UV package, NUCREL® ethylene acid copolymer resin, and HDPE were mixed and extruded onto bulbs. The bulbs used were Shat-R-Shield F96T12 CW/HO (20 pieces). Passed drop test. End caps still separated.

On a third sample run, the following components were combined in the following blender settings: UV package 2.5, NUCREL® ethylene acid copolymer resin 75, and HDPE 25. At the extruder, the UV package, NUCREL® ethylene acid copolymer resin, and HDPE were mixed and extruded onto bulbs. The bulbs used were Shat-R-Shield F96T12 CW/HO (15 pieces) and Phillips F96T12/VHO (15 pieces). Plastic had white appearance. Ends separated. Passed drop test but very small glass shards poked holes in coating.

Comparative Example 8

Glow pellets were obtained. The pellets were comprised of 75 parts of NUCREL® ethylene acid copolymer resin and 25 parts of a $SrAl_2O_4$:Eu;Dy glow powder blend GCX11295 from RTP Company.

On a $1^{st}$ Glow Sample Run, the following components were combined in the following blender settings: NUCREL® ethylene acid copolymer resin 77.5, UV package 2.5, and glow pellets 20. UV package same as Comparative Example 4. Pellets were pumped into extruder. At the extruder, the NUCREL® ethylene acid copolymer resin, UV package, and glow pellets were mixed and extruded onto bulbs. The bulbs used were Phillips PF32T8TL730 Alto (50 pieces), Phillips PF32T8TL741 Alto (50 pieces), Phillips PF32T8TL850 Alto (50 pieces). The coating was extruded on the bulbs at a thickness of 16 to 20 mils. It was determined that the bulbs did not glow brightly enough based upon visual observation.

On a $2^{nd}$ Glow Sample Run, the following components were combined in the following blender settings: NUCREL® ethylene acid copolymer resin 77.5, UV package 2.5, and glow pellets 20. UV package same as above run. Pellets were pumped into extruder. At the extruder, the NUCREL® ethylene acid copolymer resin, UV package, and glow pellets were mixed and extruded onto bulbs. The bulbs used were Phillips PF32T8TC741 Alto (25 pieces). The coating was extruded on the bulbs at a thickness of 22 to 28 mils thick. It was determined that the bulbs did not glow brightly enough based upon visual observation.

On a $3^{rd}$ Glow Sample Run, the following components were combined in the following blender settings: NUCREL® ethylene acid copolymer resin 57.5 weight, UV package 2.5, and glow pellets 40. UV package same as above run. Pellets were pumped into extruder. At the extruder, the NUCREL® ethylene acid copolymer resin, UV package, and glow pellets were mixed and extruded onto bulbs. The bulbs used were Phillips PF32T8TL730 Alto (25 pieces), PF32T8TL741 Alto (25 pieces), PF32T8TL850 Alto (25 pieces). The coating was extruded on the bulbs at a thickness of 16 to 20 mils. Two samples of each bulb type were installed in a fixture and subjected to a burn test. The results were unacceptable as the bulb did not burn brightly enough.

$4^{th}$ Glow Sample Run, the following components were combined in the following blender settings: NUCREL® 57.5, UV package 2.5, and glow pellets 40. UV package same as above run. Pellets were pumped into extruder. At the extruder, the NUCREL®, UV package, and glow pellets were mixed and extruded onto bulbs. The bulbs used were Phillips PF32T8TL730 Alto (25 pieces), PF32T8TL741 Alto (25 pieces), PF32T8TL850 Alto (25 pieces). The coating was extruded on the bulbs at a thickness of 20 to 27 mils. Two samples of each bulb type were installed in a fixture and subjected to a burn test. The results were unacceptable as the bulb did not burn brightly enough.

Comparative Example 9

Glow pellets were obtained. The pellets were comprised of 75 weight percent of NUCREL® ethylene acid copolymer resin and 25 weight percent of a $SrAl_2O_4$:Eu;Dy glow powder blend GCX11295 obtained from RTP Company.

In a run, the following components were combined in the following blender settings: glow pellets 60, UV package 2.5, NUCREL® ethylene acid copolymer resin 37.5. UV package same as Comparative Example 4. At the extruder, the NUCREL® ethylene acid copolymer resin, UV package, and glow pellets were mixed and extruded onto bulbs. The bulbs used were Sylvania Syl F32T8 850/XP/ECO (30 pieces). The bulbs coated well and separated well. Passed drop test. Bulbs did not glow brightly enough based upon visual observation.

Comparative Example 10

Glow pellets were obtained. The glow pellets comprised 75 weight percent of NUCREL® ethylene acid copolymer resin and 25 weight percent of a $SrAl_2O_4$:Eu;Dy glow powder blend GCX11295 from RTP Company. No UV package was added. No NUCREL® ethylene acid copolymer resin was added other than what was in the glow pellet.

The glow pellets were pumped into extruder. At the extruder, the UV and glow pellets were mixed. The heat settings on the extruder were 400° F. for each of Zone #1, Zone #2, and Zone #3. The Die #1 and Die #2 temperature settings on the extruder were each 400° F. The screw speed was 52 rpm.

The end caps at each end of a bulb were preheated at one end to 740° F. and the other end to 750° F. The bulbs used were Phillips PF32T8TL730 Alto (1 case), PF32T8TL741/Plus/ Alto (1 case), and PF32T8TL850/Alto (1 case). The coating separated clean on the ends. Drop test was good. Bulb was installed for burn test and passed. However, bulb still considered as failed because with lack of UV package performance of the bulb would not last the life of the bulb.

As illustrated in the above examples, the composition of the present invention is particularly important so as to be able to achieve both properties in a light tube—shatterproof and after-glow. For example, the coating composition needs to be such that it allows for a durable product that lasts the life of the light tube or bulb and provides a shatterproof cover. The selection of a suitable polymer is also important because without it a bond is not created between the polymer and the end-cap. If this bond is not created, a shatterproof light is not achieved because glass could escape out the ends. As illustrated in the examples, experiments with other polymers such as polypropylene combined with the glow phosphor were unsuccessful because it did not adhere to the light end-caps thus rendering it incapable of containing the glass in the event that the glass is broken. Other polymers such as polyester or polyethylene were too rigid and did not adhere to the end cap so that when the glass breaks the cover is also destroyed again rendering it incapable of meeting the critical characteristic of glass containment. Furthermore, not all polymers in combination with after-glow phosphor provided the desired amount of brightness for most after-glow applications. Thus, the shatterproof after-glow composition of the present invention is particularly desirable.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A light tube comprising:
   a cylinder sealed by glass and metal end caps on each end of the glass-sealed cylinder, and electrical conducting pins extending from at least one of the metal end caps to connect the light tube to a power source,
   the glass-sealed cylinder being coated on its exterior without any element physically intervening the coating and the end caps, the coating being a shatterproof coating composition that emits an after-glow effect, the coating composition comprised of a strontium aluminate afterglow phosphor, an ethylene acid copolymer resin, and an ultraviolet additive.

2. The light tube as claimed in claim 1, wherein the ethylene acid copolymer resin comprises ethylene and methacrylic acid.

3. The light tube as claimed in claim 1, wherein the strontium aluminate is $SrAl_2O_4$:Eu,Dy.

4. The light tube as claimed in claim 1, wherein the afterglow phosphor emits a green light.

5. The light tube as claimed in claim 1, wherein the ultraviolet additive is in a form of an ultraviolet package comprising an ethylene acid copolymer resin, an ultraviolet stabilizer, an ultraviolet absorber, an antioxidant, an emulsifier, or a combination thereof.

6. The light tube as claimed in claim 5, wherein the ultraviolet package is present in an amount greater than zero percent to 3 weight percent of the coating composition.

7. The light tube as claimed in claim 6, wherein the ultraviolet package is present in an amount greater than zero percent to 2.5 weight percent of the coating composition.

8. The light tube as claimed in claim 1, wherein the strontium aluminate after-glow phosphor is present in an amount greater than 15 weight percent of the coating composition.

9. The light tube as claimed in claim 8, wherein the strontium aluminate after-glow phosphor is present in an amount greater than 20 weight percent of the coating composition.

10. The light tube as claimed in claim 1, wherein the ethylene acid copolymer resin is present in an amount less than 82.5 weight percent of the coating composition.

11. The light tube as claimed in claim 10, wherein the ethylene acid copolymer resin is present in an amount less than 75 weight percent of the coating composition.

12. The light tube as claimed in claim 1, wherein the coating composition is extruded on the glass-sealed cylinder.

13. A light tube comprising a cylinder sealed by glass and metal end caps on each end of the glass-sealed cylinder with electrical conducting pins extending from at least one of the metal end caps to connect the light tube to a power source, the improvement comprising that the glass cylinder is coated on its exterior with a polymeric coating composition without any element physically intervening the coating and the end caps, the coating being shatterproof and having an after-glow effect.

14. A light tube comprising a cylinder sealed by glass and metal end caps on each end of the glass-sealed cylinder with electrical conducting pins extending from at least one of the metal end caps to connect the light tube to a power source, the glass cylinder being coated on its exterior with a coating composition without any element physically intervening the coating and the end caps, the coating composition for the light tube having both shatterproof and after-glow properties, the composition comprising:
   a strontium aluminate after-glow phosphor,
   an ethylene acid copolymer resin, and
   an ultraviolet additive,
   wherein the coating composition is without a florescent dye.

15. The light tube as claimed in claim 14, wherein the ethylene acid copolymer resin comprises ethylene and methacrylic acid.

16. The light tube as claimed in claim 14, wherein the strontium aluminate is $SrAl_2O_4$:Eu,Dy.

17. The light tube as claimed in claim 14, wherein the after-glow phosphor emits a green light.

18. The light tube as claimed in claim 14, wherein the ultraviolet additive is in a form of an ultraviolet package comprising an ethylene acid copolymer resin, an ultraviolet stabilizer, an ultraviolet absorber, an antioxidant, an emulsifier, or a combination thereof.

19. The light tube as claimed in claim 18, wherein the ultraviolet package is present in an amount greater than zero percent to 3 weight percent of the coating composition.

20. The light tube as claimed in claim 19, wherein the ultraviolet package is present in an amount greater than zero percent to 2.5 weight percent of the coating composition.

21. The light tube as claimed in claim 14, wherein the strontium aluminate after-glow phosphor is present in an amount greater than 15 weight percent of the coating composition.

22. The light tube as claimed in claim 21, wherein the strontium aluminate after-glow phosphor is present in an amount greater than 20 weight percent of the coating composition.

23. The light tube as claimed in claim 14, wherein the ethylene acid copolymer resin is present in an amount less than 82.5 weight percent of the coating composition.

24. The light tube as claimed in claim 23, wherein the ethylene acid copolymer resin is present in an amount less than 75 weight percent of the coating composition.

25. A method of coating a chain of at least two light tubes with a shatterproof after-glow coating, each light tube having a transparent or translucent main light body and end caps at the opposite ends of the main light body with the end caps having electrically conductive pins extending from at least one of the end caps, the method comprising:
heating only the end caps of the light tubes prior to coating the light tubes on a coating conveyor system;
sequentially loading the light tubes on the coating conveyor system;
sequentially feeding the light tubes at a consistent travel rate with a gap between the light tubes to a coating station, which includes a coating machine; and
applying a shatterproof after-glow coating to the chain of light tubes and the gaps between the light tubes with the entirety of the end caps uncovered at the coating station for direct contact of the coating with the main light body and with the end caps without any other element physically intervening the coating and the end caps while maintaining the gap at a length to prevent the coating from contacting the electrically conductive pins of the end caps of the light tubes, wherein the shatterproof after-glow coating comprises a strontium aluminate after-glow phosphor, an ethylene acid copolymer resin, and an ultraviolet additive.

26. The method as claimed in claim 25, wherein the ethylene acid copolymer resin comprises ethylene and methacrylic acid.

27. The method as claimed in claim 25, wherein the strontium aluminate is $SrAl_2O_4$:Eu,Dy.

28. The method as claimed in claim 25, wherein the afterglow phosphor emits a green light.

29. The method as claimed in claim 25, wherein the ultraviolet additive is in a form of an ultraviolet package comprising an ethylene acid copolymer resin, an ultraviolet stabilizer, an ultraviolet absorber, an antioxidant, an emulsifier, or a combination thereof.

30. The method as claimed in claim 29, wherein the ultraviolet package is present in an amount greater than zero percent to 3 weight percent of the coating composition.

31. The method as claimed in claim 30, wherein the ultraviolet package is present in an amount greater than zero percent to 2.5 weight percent of the coating composition.

32. The method as claimed in claim 25, wherein the strontium aluminate after-glow phosphor is present in an amount greater than 15 weight percent of the coating composition.

33. The method as claimed in claim 32, wherein the strontium aluminate after-glow phosphor is present in an amount greater than 20 weight percent of the coating composition.

34. The method as claimed in claim 25, wherein the ethylene acid copolymer resin is present in an amount less than 82.5 weight percent of the coating composition.

35. The method as claimed in claim 34, wherein the ethylene acid copolymer resin is present in an amount less than 75 weight percent of the coating composition.

36. A method for coating a plurality of at least two light tubes with a shatterproof after-glow coating, each light tube having a transparent or translucent main light body and end caps at the opposite ends of the main light body with the end caps having electrically conductive pins extending from at least one of the end caps, the method comprising:
heating only the end caps of the plurality of light tubes prior to coating the light tubes;
conveying the plurality of light tubes sequentially in longitudinal alignment with one another at a consistent travel rate with a gap between the light tubes; and
extruding a shatterproof after-glow coating about each light tube and the gap between the light tubes with the entirety of the end caps uncovered such that the coating is substantially in direct intimate contact with the main light body and with the end caps without any other element physically intervening the coating and the end caps while maintaining the gap at a length to prevent the coating from contacting the electrically conductive pins on the end caps of the light tubes,
wherein the shatterproof after-glow coating comprises a strontium aluminate after-glow phosphor, an ethylene acid copolymer resin, and an ultraviolet additive.

37. The method as claimed in claim 36, wherein the ethylene acid copolymer resin comprises ethylene and methacrylic acid.

38. The method as claimed in claim 36, wherein the strontium aluminate is $SrAl_2O_4$:Eu,Dy.

39. The method as claimed in claim 36, wherein the afterglow phosphor emits a green light.

40. The method as claimed in claim 36, wherein the ultraviolet additive is in a form of an ultraviolet package comprising an ethylene acid copolymer resin, an ultraviolet stabilizer, an ultraviolet absorber, an antioxidant, an emulsifier, or a combination thereof.

41. The method as claimed in claim 40, wherein the ultraviolet package is present in an amount greater than zero percent to 3 weight percent of the coating composition.

42. The method as claimed in claim 41, wherein the ultraviolet package is present in an amount greater than zero percent to 2.5 weight percent of the coating composition.

43. The method as claimed in claim 42, wherein the strontium aluminate after-glow phosphor is present in an amount greater than 15 weight percent of the coating composition.

44. The method as claimed in claim 43, wherein the strontium aluminate after-glow phosphor is present in an amount greater than 20 weight percent of the coating composition.

45. The method as claimed in claim 36, wherein the ethylene acid copolymer resin is present in an amount less than 82.5 weight percent of the coating composition.

46. The method as claimed in claim 45, wherein the ethylene acid copolymer resin is present in an amount less than 75 weight percent of the coating composition.

* * * * *